(12) United States Patent
Moniaci (10) Patent No.: US 10,352,804 B2
(45) Date of Patent: Jul. 16, 2019

(54) SYSTEM AND METHOD OF INDIVIDUALLY PRESSURIZING A PLURALITY OF AIR TUBES TO PROVIDE A PRESSURE ADJUSTABLE BED SYSTEM

(71) Applicant: Douglas James Moniaci, Clarkston, MI (US)

(72) Inventor: Douglas James Moniaci, Clarkston, MI (US)

( * ) Notice: Subject to any disclaimer, the term of this patent is extended or adjusted under 35 U.S.C. 154(b) by 50 days.

(21) Appl. No.: 15/701,395

(22) Filed: Sep. 11, 2017

(65) Prior Publication Data

US 2018/0073948 A1 Mar. 15, 2018

Related U.S. Application Data

(60) Provisional application No. 62/385,796, filed on Sep. 9, 2016.

(51) Int. Cl.
*G01L 19/00* (2006.01)
*A47C 27/08* (2006.01)
*A47C 20/04* (2006.01)
*A61G 7/057* (2006.01)

(52) U.S. Cl.
CPC ........ *G01L 19/0038* (2013.01); *A47C 20/048* (2013.01); *A47C 27/083* (2013.01); *A61G 7/05769* (2013.01); *A61G 2203/34* (2013.01)

(58) Field of Classification Search
CPC ............................ G01L 19/0038; G01L 19/00
See application file for complete search history.

(56) References Cited

U.S. PATENT DOCUMENTS

| 4,982,466 | A | * | 1/1991 | Higgins | ............... | A47C 27/082 5/713 |
| 2010/0064443 | A1 | * | 3/2010 | Lee | .................... | A61G 7/05776 5/713 |
| 2017/0340134 | A1 | * | 11/2017 | Piraino | .................. | A61G 7/057 |

* cited by examiner

*Primary Examiner* — Jamel E Williams (57) ABSTRACT

A method of individually pressurizing a plurality of air tubes includes the steps of providing a sealed tube body, a pressure sensor, an inlet/outlet valve for each of the plurality of air tubes, a control unit, and an air circulation system. The steps also involve retrieving an initial pressure setting for each of the plurality of air tubes with the control unit; measuring a current pressure within the sealed body; comparing the initial pressure setting to the current pressure for each of the plurality of air tubes; opening the inlet/outlet valve of an off-pressure tube and pumping air into the sealed tube body of the off-pressure tube with the air circulation system, if the current pressure is lower than the initial pressure setting; and opening the inlet/outlet valve of the off-pressure tube and releasing air out of the sealed tube body of the off-pressure tube with the air circulation system, if the current pressure is higher that the initial pressure setting.

10 Claims, 9 Drawing Sheets

SYSTEM AND METHOD OF INDIVIDUALLY PRESSURIZING A PLURALITY OF AIR TUBES TO PROVIDE A PRESSURE ADJUSTABLE BED SYSTEM

The current application claims a priority to the U.S. Provisional Patent application Ser. No. 62/385,796 filed on Sep. 9, 2016. The current application is filed on Sep. 11, 2017 while Sep. 9, 2017 was on a weekend.

FIELD OF THE INVENTION

The present invention generally relates to system and method that enables a pressure adjustable bed system. More specifically, a method of automatically or manually controlling each of the plurality of air tubes to a current pressure chosen by a user is disclosed.

BACKGROUND OF THE INVENTION

The present invention is a method and system for facilitating a pressure adjustable bed system and helps users enjoy a restful night of sleep without experience body aches. Conventional non-pressure-adjustable beds rely on spring and the natural flexion of the mattress to cushion the user's body. However, the cushioning effect is usually not very effective. This causes the formation on pressure points where the user's body exerts the greatest force. Pressure points usually form on the hips and back area of the body, since most of the weight of the human body is concentrated in these areas. These pressure points can lead to chronic back ache, which can cause loss of sleep and insomnia.

There are many devices that attempt to solve the problems of pressure points. However, current pressure adjustable beds fail to properly support the user's body. Conventional pressure adjustable beds try to reduce back pain by creating very soft surfaces where the users back rests on the bed. This reduces the pressure exerted on the bed. However, the surface of bed in contact with the rest of the user's body such as the lower leg area, knees, upper legs, hips, side, shoulder, neck, and head are usually firm. The imbalance of firmness on the surface of the bed causes the back to sink into the bed, and causes the user's body to bend. This results in a very uncomfortable experience for the user. Worse, this can exacerbate back pain.

The present invention is a system and method of providing a pressure adjustable bed system that prevents an uneven distribution of pressure on the user's body, which can create pressure points. The pressure points result in an uncomfortable experience for the user and can lead to back pain. The present invention enables a manual operating mode that allows the user to manually adjust the pressure exerted by each air tube and create a pressure profile that results in the most comfortable experience. Additionally, an automatic operating mode automatically adjusts the pressure inside each air tube to ensure a uniform distribution of pressure.

DETAILED DESCRIPTION OF THE INVENTION

All illustrations of the drawings are for the purpose of describing selected versions of the present invention and are not intended to limit the scope of the present invention.

Figure 1:
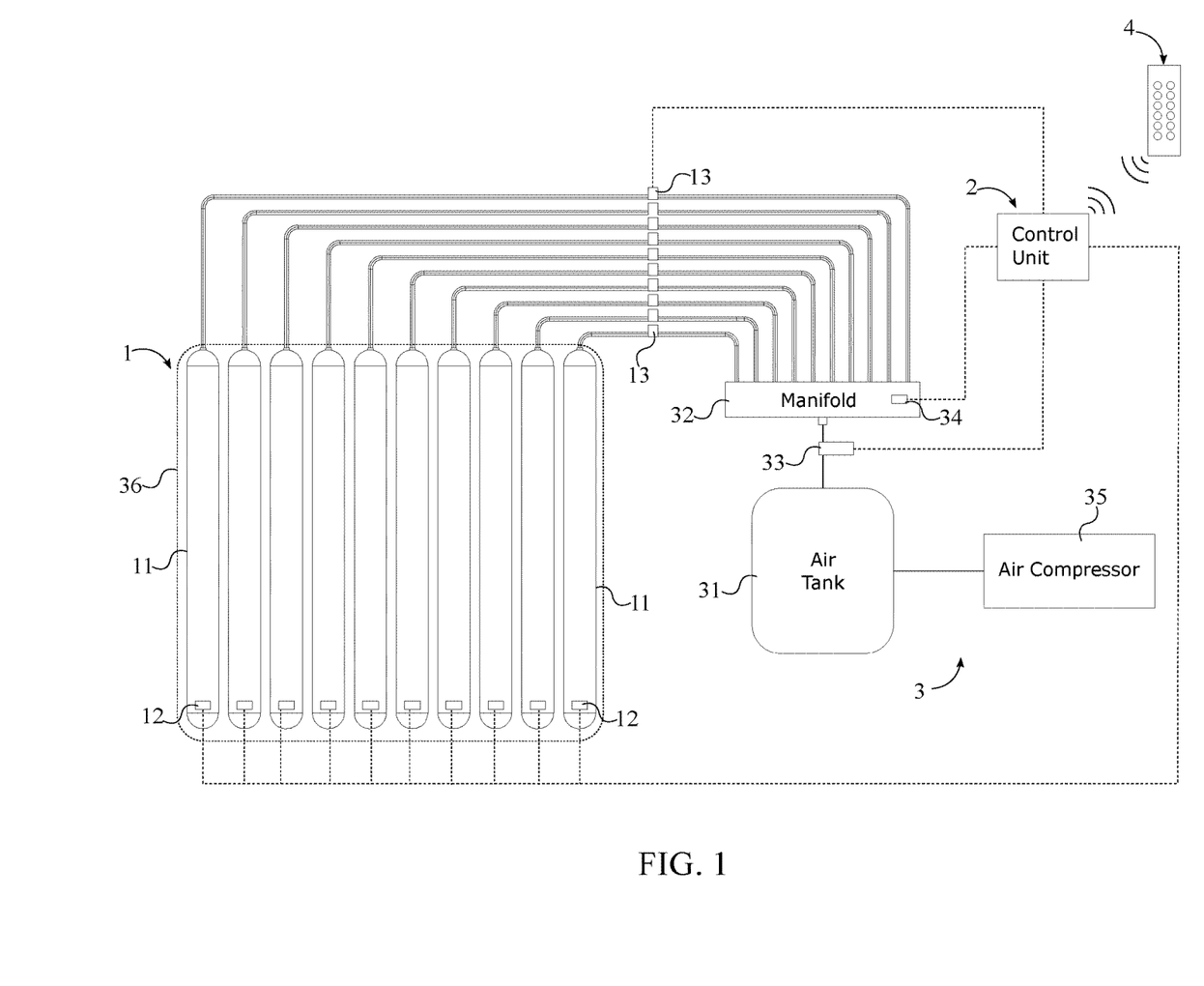
FIG. 1 is a schematic view of the present invention showing the electronic connection and fluid communication between the components.

In reference to FIG. 1, the present invention is a method of individually pressurizing a plurality of air tubes 1 to provide a pressure adjustable bed system. The system used to implement the method of the present invention includes a sealed tube body 11, a pressure sensor 12, and an inlet/outlet valve 13 for each of the plurality of air tubes 1, wherein the inlet/outlet valve 13 defaults to a closed position. The plurality of air tubes 1 is assembled together to form a pressure adjustable bed system. When a user lays on top of the bed, the user's weight is distributed between the plurality of air tubes 1. Thus, the pressure exerted on each of the plurality of air tube varies according to how much of the user's weight is resting on the corresponding sealed tube body 11. The pressure sensor 12 of each of the air tubes records the pressure inside the sealed tube body 11. The inlet/outlet valve 13 allows air to enter and exit the sealed air tube to raise or lower the pressure level (Step A). A control unit 2 and an air circulation system 3 are provided for monitoring and adjusting the pressure within the sealed tube body 11 of each of the plurality of air tubes 1. As such, the control unit 2 electronically connects to the pressure sensor 12 and the inlet/outlet valve 13 for each of the plurality of air tubes 1 and the air circulation system 3 (Step B). The pressure sensor 12 records pressure inside each air tube and transmits the recordings to the control unit 2. The control unit 2 analyzes the pressure readings and determines whether to open the inlet/outlet valve 13 of the corresponding air tube. In order to raise the pressure, the control unit 2 commands the air circulation system 3 to pump air into the sealed tube body 11 of the corresponding air tube. In order to lower pressure, the control unit 2 simply opens the inlet/outlet valve 13 of the corresponding air tube. In the preferred embodiment of the present invention, the control unit 2 is an Arduino.

Figure 2:
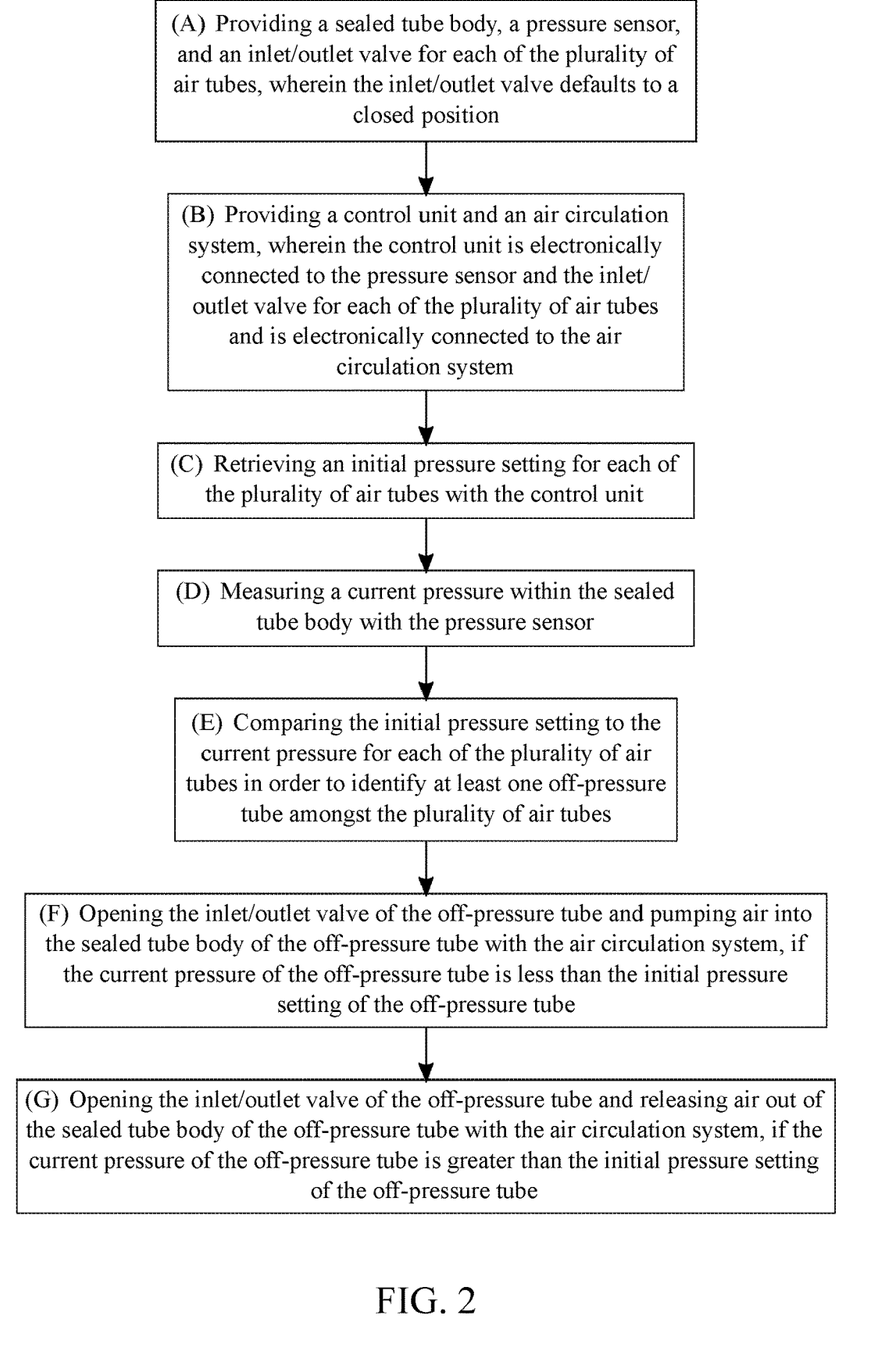
FIG. 2 is a flow chart showing the order of operation of Step A through Step G.

Referring to FIG. 2, the overall process followed by the method of the present invention enables the control unit to determine whether to raise or lower the pressure inside each of the plurality of air tubes. The overall process begins by retrieving an initial pressure setting for each of the plurality of air tubes with the control unit (Step C). More specifically, the initial pressure setting is inputted by a user using an input device and is the current pressure of the sealed tube body that needs to be maintained by the present invention. The pressure sensor then measures a current pressure within the sealed tube body (Step D). In the preferred implementation, the pressure sensor passively records a plurality of pressure readings taken over a period of time. Thus, if the current pressure in one of the plurality of air tubes changes unexpectedly, the control unit can quickly react to increase or decrease the current pressure. Once the initial pressure setting is retrieved, the control unit compares the initial pressure setting to the current pressure for each of the plurality of air tubes in order to identify at least one off-pressure tube amongst the plurality of air tubes (Step E).

If the current pressure of the off-pressure tube falls below the initial pressure setting, which can happen if a load is lifted off of the sealed tube body, the control unit actuates the air circulation system to pump air into the off-pressure tube. As such, the control unit tries to increase the pressure in the off-pressure tube. The method of increasing the pressure inside the off-pressure tube involves opening the inlet/outlet valve of the off-pressure tube and pumping air into the sealed tube body of the off-pressure tube with the air circulation system (Step F). Conversely, when the user's body presses against the sealed tube body, the internal volume is reduced which causes an increase in the current pressure. This creates an off-pressure tube with a current pressure that is higher than the initial pressure setting chosen by the user. The method of reducing the pressure inside the off-pressure tube involves opening the inlet/outlet valve of the off-pressure tube and releasing air out of the sealed tube body of the off-pressure tube with the air circulation system (Step G).

Figure 3:
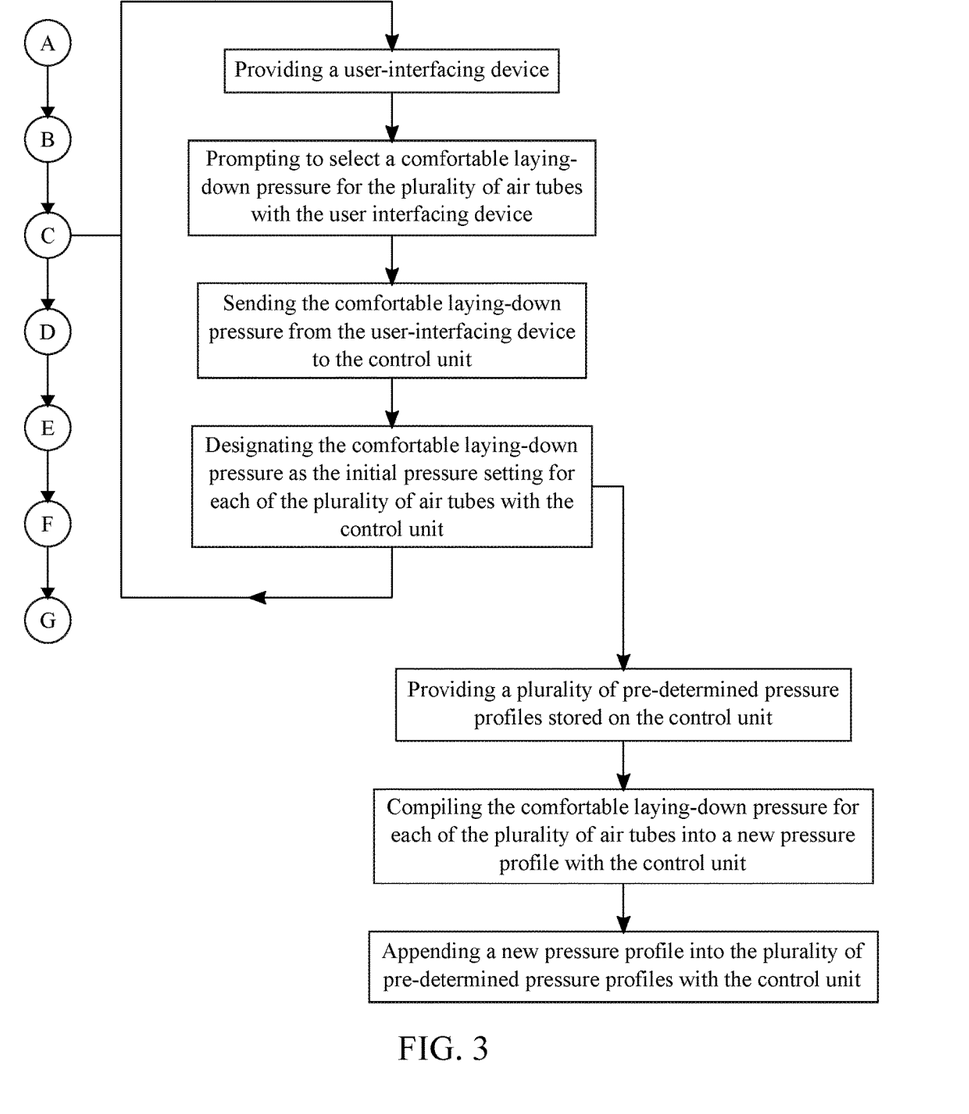
FIG. 3 is a flow chart showing the sub-processes of Step C and the sub-processes for designating the comfortable laying-down pressure in automatic operation mode.

Referring now to FIG. 3, in the preferred embodiment of the present invention, the user utilizes a user-interfacing device 4 to input an initial pressure setting into the control unit. The preferred user-interfacing device 4 is a wireless remote controller in wireless communication with the control unit. The user can use the wireless remote controller to turn the present invention on or off and choose between an automatic operating mode and a manual operating mode. More specifically, the user can select the automatic operating mode by turning an automatic pressure selector dial. The automatic operating mode is a specific process for executing Step C that allows the user to automatically control the initial pressure setting for each air tube. In automatic operating mode, the user is prompted to select a single comfortable laying-down pressure for the plurality of air tubes with the user-interfacing device 4. The single comfortable laying-down pressure is set as the initial pressure settings for the plurality of air tubes. Accordingly, the control unit increases or decreases the pressure in the plurality of air tubes until the current pressures in the plurality of air tubes match the single comfortable laying-down pressure.

Since each air tube has a different current pressure, some air tubes may require an increase in current pressures while others may require a decrease in the current pressures. This is because the pressure applied on the plurality of air tubes by the user's body depends on the weight distribution of the user's body. Since most of the body mass is concentrated near the hip area, the air tubes located below the user's hips exert the greatest pressure on the user's body. More specifically, the air tubes located below the user's hips are compressed the greatest amount which increases the current pressure. In contrast, the air tubes located below the lower leg area, knees, upper legs, hips, side, shoulder, neck, and head experience less compression and therefore exert lower pressure on the user's body. When the user selects the comfortable-laying down pressure in automatic mode, the initial pressure setting for each of the plurality of air tubes is adjusted to match the comfortable-laying down pressure.

The comfortable-laying down pressure is used to uniformly support the user's body. The control unit tries to adjust the current pressure within the plurality of air tubes until the current pressure matches the comfortable-laying down pressure. To choose a comfortable laying-down pressure, the user can lay on the bed and adjust the comfortable laying-down pressure until the desired level of support is reached. As such, once selected, the comfortable laying-down pressure is sent from the user-interfacing device to the control unit. The control unit designates the comfortable laying-down pressure as the initial pressure setting for each of the plurality of air tubes with the control unit. Thus, the control unit actuates the air circulation system to ensure that the current pressure within the plurality of air tubes matches the initial pressure setting and thus the comfortable laying-down pressure selected by the user.

Figure 4:
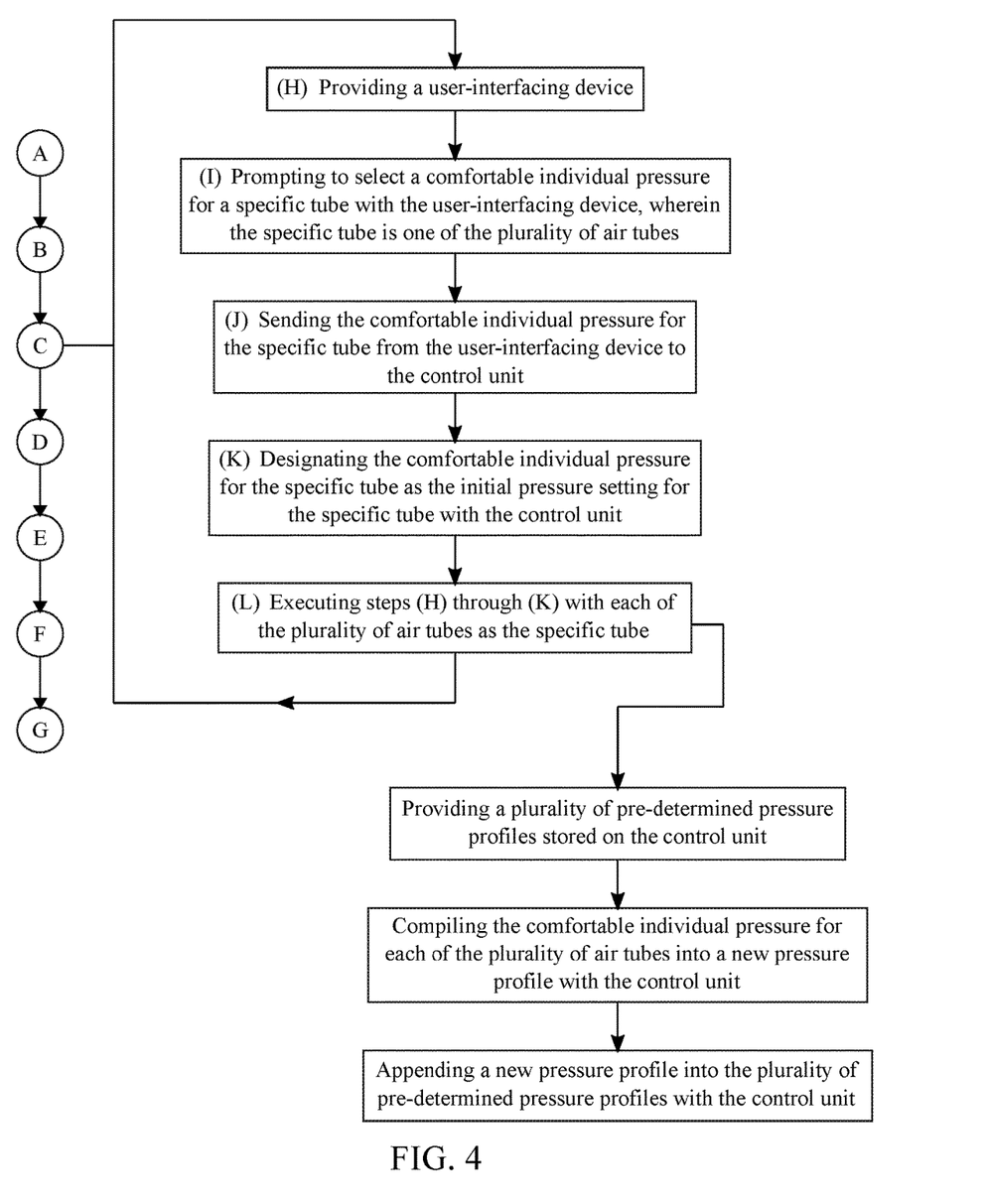
FIG. 4 is a flow chart showing the sub-processes of Step C and the sub-processes for designating the comfortable laying-down pressure in manual operation mode.

Referring now to FIG. 4, alternately, the user can choose the manual operating mode on the user-interfacing device, by turning the manual pressure adjustment dial on the wireless remote controller (Step H). Unlike the automatic operating mode, manual operating mode is a specific process for Step C that allows the user to directly adjust the initial pressure setting for each of the plurality of air tubes. In manual operating mode, the user is prompted to select a comfortable individual pressure for a specific tube with the user-interfacing device, wherein the specific tube is one of the plurality of air tubes (Step I). The specific tube from the plurality of air tubes is chosen based on which area of the user's body requires the most support. Similarly, the specific tube can be any one of the plurality of air tubes that the user is currently controlling. This is done by pressing the plus (+) or (−) buttons above and on the wireless remote controller. Holding down either the + or − button to can quickly raise or lower the pressure to the desired level desired. The comfortable individual pressure is then sent from the user-interfacing device to the control unit (Step J). Since the user can control the pressure inside an individual air tube, the control unit designates the comfortable individual pressure for the specific tube as the initial pressure setting for the specific tube (Step K). As such, the control unit uses the air circulation system to match the current pressure to the initial pressure setting for the specific tube and thus the comfortable individual pressure. Finally, the manual operating mode involves executing Steps H through Step K with each of the plurality of air tubes as the specific tube. More specifically, the user may execute Steps H through Step K sequentially on each of the plurality of air tubes.

Figure 5:
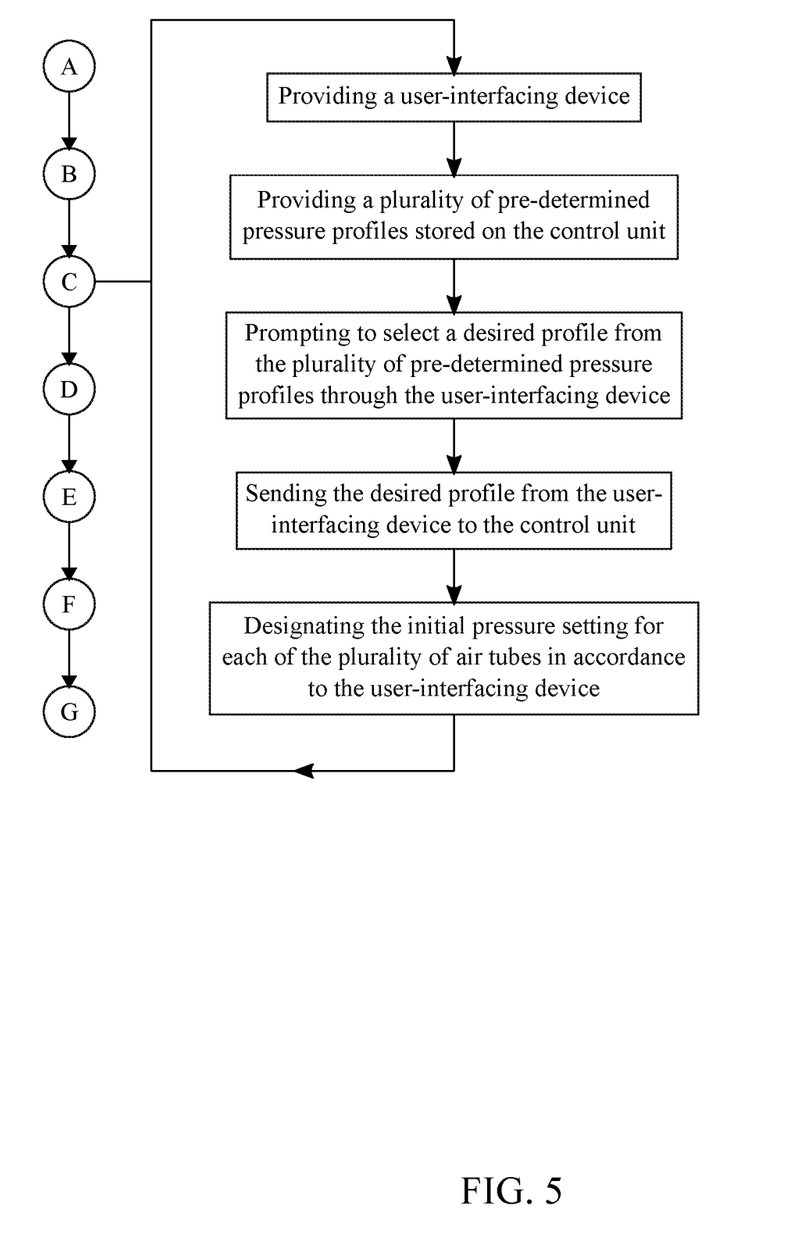
FIG. 5 is a flow chart showing the sub-processes of Step C for setting the plurality of pre-determined pressure profiles as the initial pressure settings.

In reference to FIG. 5, the plurality of pre-determined pressure profiles is created through either the automatic or manual operating mode via the user-interfacing device. The plurality of pre-determined pressure profiles is then stored on the control unit. As such, the user may be prompted to select a desired profile from the plurality of pre-determined pressure profiles through the user-interfacing device. The desired profile is then sent from the user-interfacing device to the control unit, whereby the control unit actuates the air circulation system to match current pressure of the plurality of air tubes to the desired profile. More specifically, the control unit designates the initial pressure setting for each of the plurality of air tubes in accordance to the user-interfacing device. As such, the control unit commands the air circulation system to match the current pressure of the plurality of air tubes to the initial pressure setting selected by the desired profile.

The user-interfacing device can also set a plurality of pre-determined pressure profiles. Referring back to FIG. 3, in automatic operating mode, the plurality of pre-determined pressure profiles is provided by multiple users and stored in the control unit. For example, a first user may create a first pressure profile that includes the customized initial pressure settings for the plurality of air tubes. The initial pressure setting for each of the plurality of air tubes that matches the desired comfortable laying-down pressure are compiled into a first pressure profile with the control unit. A second user may create a second pressure profile by choosing a different comfortable laying-down pressures for the plurality of air tubes. The different initial pressure settings for the plurality of air tubes required to match the different comfortable laying-down pressures are compiled into a new pressure profile with the control unit. The new pressure profile is appended into the first pressure profile to create a plurality of pre-determined pressure profiles with the control unit.

Referring back to FIG. 4, the manual operating mode can also be used to set a plurality of pre-determined pressure profiles on the control unit. A first user can create a first pressure profile that compiles the comfortable individual pressure for each of the plurality of air tubes. The first pressure profile is stored in the control unit. Similarly, a second user can create a new pressure profile that includes a separate comfortable individual pressure for each of plurality of air tubes. The new pressure profile is appended into the plurality of pressure profiles via the control unit. The preferred embodiment of the present invention can store five pressure profiles in the control unit, however alternate embodiments may easily store additional profiles.

Figure 6:
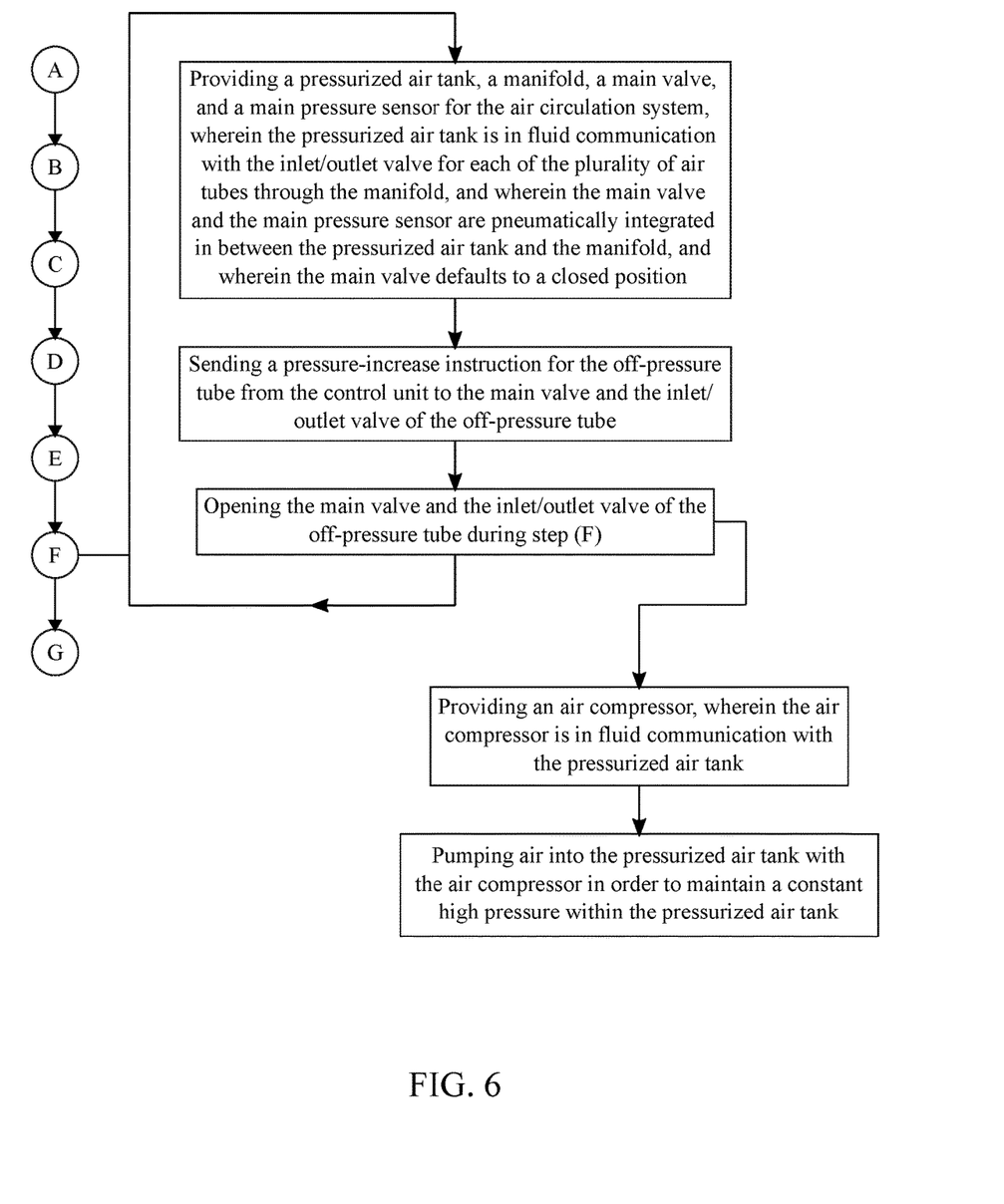
FIG. 6 is a flow chart showing the sub-processes of Step F and the sub-processes for opening the main valve and the inlet/outlet valve of the off-pressure tube when the current pressure is lower than the initial pressure setting.

In reference to FIG. 6, the process described in Step F and Step G utilizes the air circulation system to pump air into and bleed air out of the plurality of air tubes. Accordingly, the air circulation system is provided with a pressurized air tank 31, a manifold 32, a main valve 33, and a main pressure sensor 34. The pressurized air tank 31 is in fluid communication with the inlet/outlet valve for each of the plurality of air tubes through the manifold 32, wherein the inlet/outlet valve defaults to a closed position. The main valve 33 and the main pressure sensor 34 are pneumatically integrated in between the pressurized air tank 31 and the manifold 32, wherein the main valve 33 selectively permits the flow of air from the pressurized air tank 31 to the manifold 32. For most of the operating cycle however, the main valve 33 defaults to a closed position and must be commanded to open by the control unit. Once the pressure sensor of an air tube determines that the air tube is an off-pressure tube, the pressure increase instruction is sent from the control unit to the main valve 33 and the inlet/outlet valve of the off-pressure tube. The pressure-increase instruction causes the main valve 33 and the inlet/outlet valve of the off-pressure tube to be opened during Step F. Only the inlet/outlet valve of the off-pressure tube is opened, while the inlet/outlet valves of the rest of the plurality of air tubes are kept closed. As such, each off-pressure tube must be inflated one by one.

In order to ensure a sufficient amount of pressure in the pressurized air tank, an air compressor 35 is provided, wherein the air compressor 35 is in fluid communication with the pressurized air tank. The air tank has a pressure setting dial to regulate maximum pressure and will cycle every day at a designated time set by user through the wireless remote controller. If the pressure falls below a specified level, the main pressure sensor signals the control unit, which actuates the air compressor 35 to pump air into the pressurized air tank in order to maintain a constant high pressure within the pressurized air tank.

Figure 8:
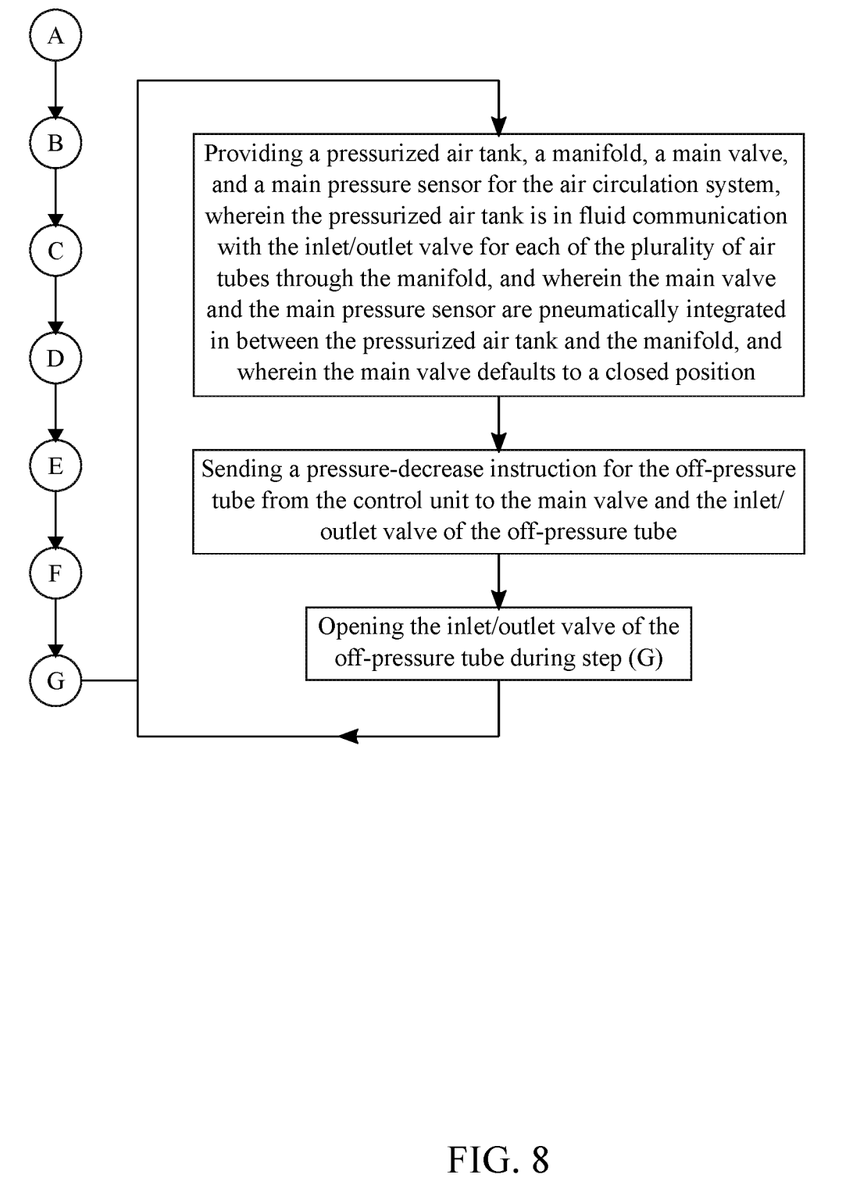
FIG. 8 is a flow chart showing the sub-processes of Step G for opening the main valve and the inlet/outlet valve of the off-pressure tube when the current pressure is higher than the initial pressure setting.

Referring now to FIG. 8, if the pressure sensor for an air tube designates the air tube as an off-pressure tube with a low pressure, the control unit sends a pressure-decrease instruction for the off-pressure tube to the main valve and the inlet/outlet valve of the off-pressure tube. This causes the control unit to open the inlet/outlet valve of the off-pressure tube during Step G.

Figure 7:
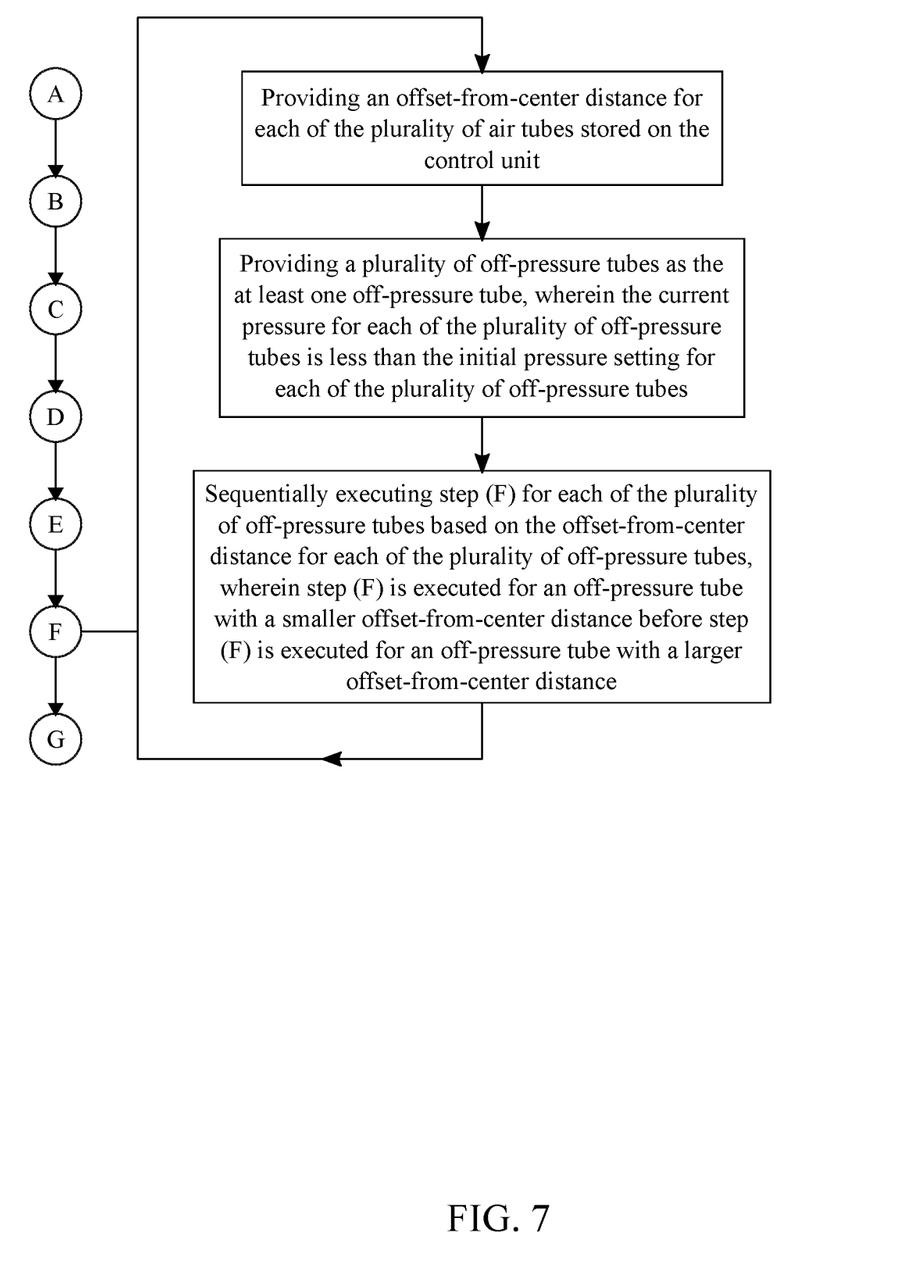
FIG. 7 is a flow chart showing the sub-processes of Step F for sequential inflation of each of the plurality of off-pressure tubes based on the offset-from-center distance.

In reference to FIG. 7, in certain circumstances, a plurality of off-pressure tubes is detected, wherein the current pressure for each of the plurality of off-pressure tubes is less than the initial pressure setting for each of the plurality of off-pressure tubes. In this case, an offset-from-center distance for each of the plurality of air tubes is stored in the control unit. The offset-from-center distance helps determine the position of one off-pressure tube in relation to the plurality of off-pressure tubes. Since the greatest pressure is likely to be experienced by an off-pressure tube located below the waist of the user, it is desirable to deflate a centrally-located off-pressure tube before inflating distally located off-pressure tubes. As such, the off-pressure tubes located below the head and the feet of the user are deflated after the off-pressure tubes located below the hips or waist of the user. More specifically, the method of inflating the plurality of off-pressure tube involves sequentially executing Step F for each of the plurality of off-pressure tubes based on the offset-from-center distance for each of the plurality of off-pressure tubes, wherein Step F is executed for an off-pressure tube with a smaller offset-from-center distance before Step F is executed for an off-pressure tube with a larger offset-from-center distance. Alternately, this can also be used to deflate the plurality of air tubes if the current pressure is greater than the initial pressure settings for the plurality of air tubes.

Figure 9:
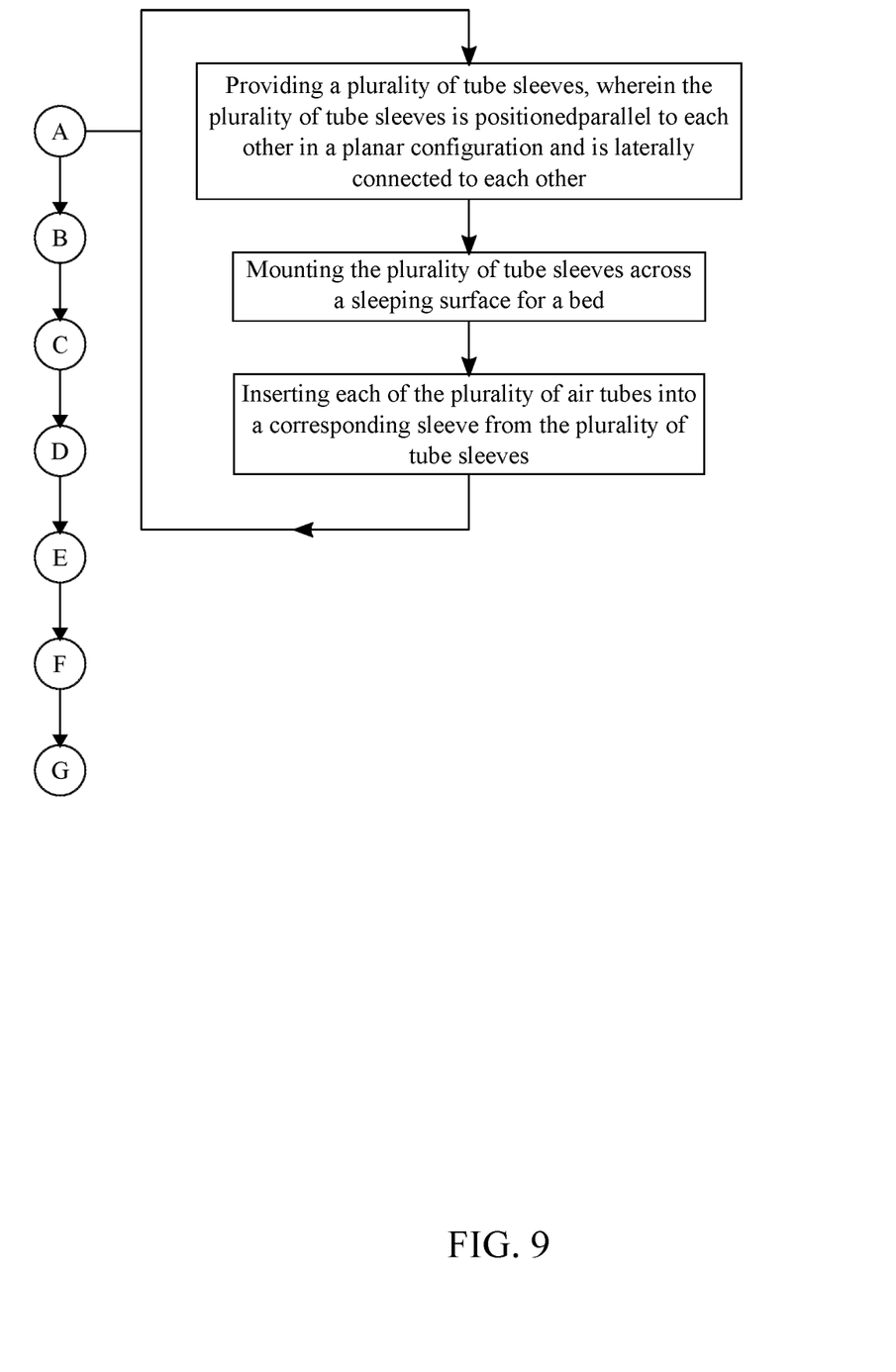
FIG. 9 is a flow chart showing the sub-processes of Step A for providing a plurality of tube sleeves.

Referring now to FIG. 9, in the preferred method for implementing the present invention, a plurality of air tubes is arranged parallel to each other. Accordingly, a plurality of tube sleeves 36 is provided, wherein the plurality of tube sleeves 36 is positioned parallel to each other in a planar configuration and is laterally connected to each other. The preferred plurality of tube sleeves 36 is made of two rectangular cloth sheets, that are segmented by stitching, creating individual tube sleeves 36 that each hold an air tube securely in place. The plurality of tube sleeves 36 is then mounted across a sleeping surface of a bed. The plurality of air tubes is then inserted into a corresponding sleeve from the plurality of tube sleeves 36 in order to create a comfortable sleeping area for the user.

Although the invention has been explained in relation to its preferred embodiment, it is to be understood that many other possible modifications and variations can be made without departing from the spirit and scope of the invention as hereinafter claimed.

What is claimed is:

1. A method of individually pressurizing a plurality of air tubes, the method comprises the steps of:
   providing a plurality of tube sleeves, wherein the plurality of tube sleeves is positioned parallel to each other in a planar configuration and is laterally connected to each other;
   mounting the plurality of tube sleeves across a sleeping surface for a bed;
   inserting each of the plurality of air tubes into a corresponding sleeve from the plurality of tube sleeves;
   (A) providing a sealed tube body, a pressure sensor, and an inlet/outlet valve for each of the plurality of air tubes, wherein the inlet/outlet valve defaults to a closed position;

(B) providing a control unit and an air circulation system, wherein the control unit is electronically connected to the pressure sensor and the inlet/outlet valve for each of the plurality of air tubes and is electronically connected to the air circulation system;

(C) retrieving an initial pressure setting for each of the plurality of air tubes with the control unit;

(D) measuring a current pressure within the sealed tube body with the pressure sensor;

(E) comparing the initial pressure setting to the current pressure for each of the plurality of air tubes in order to identify at least one off-pressure tube amongst the plurality of air tubes;

(F) opening the inlet/outlet valve of the off-pressure tube and pumping air into the sealed tube body of the off-pressure tube with the air circulation system, if the current pressure of the off-pressure tube is less than the initial pressure setting of the off-pressure tube; and (G) opening the inlet/outlet valve of the off-pressure tube and releasing air out of the sealed tube body of the off-pressure tube with the air circulation system, if the current pressure of the off-pressure tube is greater than the initial pressure setting of the off-pressure tube.

2. The method of individually pressurizing a plurality of air tubes, the method as claimed in claim 1 comprises the steps of:

providing a user-interfacing device;

prompting to select a comfortable laying-down pressure for the plurality of air tubes with the user-interfacing device;

sending the comfortable laying-down pressure from the user-interfacing device to the control unit; and designating the comfortable laying-down pressure as the initial pressure setting for each of the plurality of air tubes with the control unit.

3. The method of individually pressurizing a plurality of air tubes, the method as claimed in claim 2 comprises the steps of:

providing a plurality of pre-determined pressure profiles stored on the control unit;

compiling the comfortable laying-down pressure for each of the plurality of air tubes into a new pressure profile with the control unit; and appending a new pressure profile into the plurality of pre-determined pressure profiles with the control unit.

4. The method of individually pressurizing a plurality of air tubes, the method as claimed in claim 1 comprises the steps of:

(H) providing a user-interfacing device;

(I) prompting to select a comfortable individual pressure for a specific tube with the user-interfacing device, wherein the specific tube is one of the plurality of air tubes;

(J) sending the comfortable individual pressure for the specific tube from the user-interfacing device to the control unit;

(K) designating the comfortable individual pressure for the specific tube as the initial pressure setting for the specific tube with the control unit; and (L) executing steps (H) through (K) with each of the plurality of air tubes as the specific tube.

5. The method of individually pressurizing a plurality of air tubes, the method as claimed in claim 4 comprises the steps of:

providing a plurality of pre-determined pressure profiles stored on the control unit;

compiling the comfortable individual pressure for each of the plurality of air tubes into a new pressure profile with the control unit; and appending a new pressure profile into the plurality of pre-determined pressure profiles with the control unit.

6. The method of individually pressurizing a plurality of air tubes, the method as claimed in claim 1 comprises the steps of:

providing a user-interfacing device;

providing a plurality of pre-determined pressure profiles stored on the control unit;

prompting to select a desired profile from the plurality of pre-determined pressure profiles through the user-interfacing device;

sending the desired profile from the user-interfacing device to the control unit; and designating the initial pressure setting for each of the plurality of air tubes in accordance to the user-interfacing device.

7. The method of individually pressurizing a plurality of air tubes, the method as claimed in claim 1 comprises the steps of:

providing a pressurized air tank, a manifold, a main valve, and a main pressure sensor for the air circulation system, wherein the pressurized air tank is in fluid communication with the inlet/outlet valve for each of the plurality of air tubes through the manifold, and wherein the main valve and the main pressure sensor are pneumatically integrated in between the pressurized air tank and the manifold, and wherein the main valve defaults to a closed position;

sending a pressure-increase instruction for the off-pressure tube from the control unit to the main valve and the inlet/outlet valve of the off-pressure tube; and opening the main valve and the inlet/outlet valve of the off-pressure tube during step (F).

8. The method of individually pressurizing a plurality of air tubes, the method as claimed in claim 7 comprises the steps of:

providing an air compressor, wherein the air compressor is in fluid communication with the pressurized air tank; and pumping air into the pressurized air tank with the air compressor in order to maintain a constant high pressure within the pressurized air tank.

9. The method of individually pressurizing a plurality of air tubes, the method as claimed in claim 1 comprises the steps of:

providing a plurality of off-pressure tubes as the at least one off-pressure tube, wherein the current pressure for each of the plurality of off-pressure tubes is less than the initial pressure setting for each of the plurality of off-pressure tubes;

providing an offset-from-center distance for each of the plurality of air tubes stored on the control unit; and sequentially executing step (F) for each of the plurality of off-pressure tubes based on the offset-from-center distance for each of the plurality of off-pressure tubes, wherein step (F) is executed for an off-pressure tube with a smaller offset-from-center distance before step (F) is executed for an off-pressure tube with a larger offset-from-center distance.

10. The method of individually pressurizing a plurality of air tubes, the method as claimed in claim 1 comprises the steps of:

providing a pressurized air tank, a manifold, a main valve, and a main pressure sensor for the air circulation system, wherein the pressurized air tank is in fluid communication with the inlet/outlet valve for each of the plurality of air tubes through the manifold, and wherein the main valve and the main pressure sensor are pneumatically integrated in between the pressurized air tank and the manifold, and wherein the main valve defaults to a closed position;

sending a pressure-decrease instruction for the off-pressure tube from the control unit to the main valve and the inlet/outlet valve of the off-pressure tube; and opening the inlet/outlet valve of the off-pressure tube during step (G).

* * * * *